United States Patent [19]

Lane et al.

[11] 4,014,029

[45] Mar. 22, 1977

[54] STAGGERED NOZZLE ARRAY

[75] Inventors: Ramon Lane, Crompond; Howard Hyman Taub, Mount Kisco, both of N.Y.

[73] Assignee: International Business Machines Corporation, Armonk, N.Y.

[22] Filed: Dec. 31, 1975

[21] Appl. No.: 645,974

[52] U.S. Cl. .................................. 346/1; 156/651; 156/661; 239/601; 346/75; 346/140 R

[51] Int. Cl.[2] ....................................... G01D 15/18

[58] Field of Search ........................ 346/1, 75, 140; 239/601; 156/11

[56] References Cited

UNITED STATES PATENTS

| | | | |
|---|---|---|---|
| 3,373,437 | 3/1968 | Sweet et al. | 346/75 |
| 3,797,022 | 3/1974 | Beam et al. | 346/75 |
| 3,921,916 | 11/1975 | Bassous | 346/75 X |
| 3,949,410 | 4/1976 | Bassous et al. | 346/75 |
| 3,958,255 | 5/1976 | Chiou et al. | 346/75 X |

*Primary Examiner*—Joseph W. Hartary
*Attorney, Agent, or Firm*—Jack M. Arnold

[57] ABSTRACT

A jet printer includes a nozzle plate having at least two rows of nozzles, with the nozzles in one row being laterally staggered with respect to the nozzles in another row. The jets emanating from the respective rows of nozzles are directed in non-parallel trajectories to form at least a portion of a single line of dots at a time on a printing medium, with the jets from a given row forming non-adjacent dots on the printing medium. In practice, the nozzle plate is comprised of a semiconductor substrate, for example silicon, with the exit aperture of each of the nozzles in at least one row being axially misaligned with respect to the longitudinal center axis of their respective entrance apertures, resulting in a non-normal jet trajectory with respect to the plane of the nozzle plate.

25 Claims, 42 Drawing Figures

FIG. 5
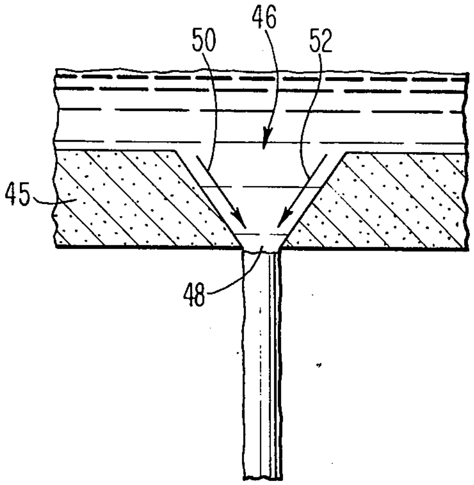
FIG. 6
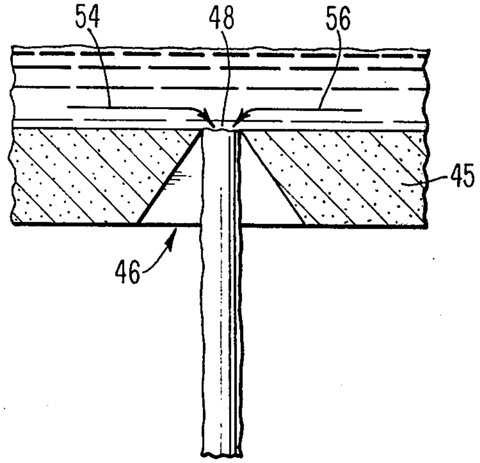
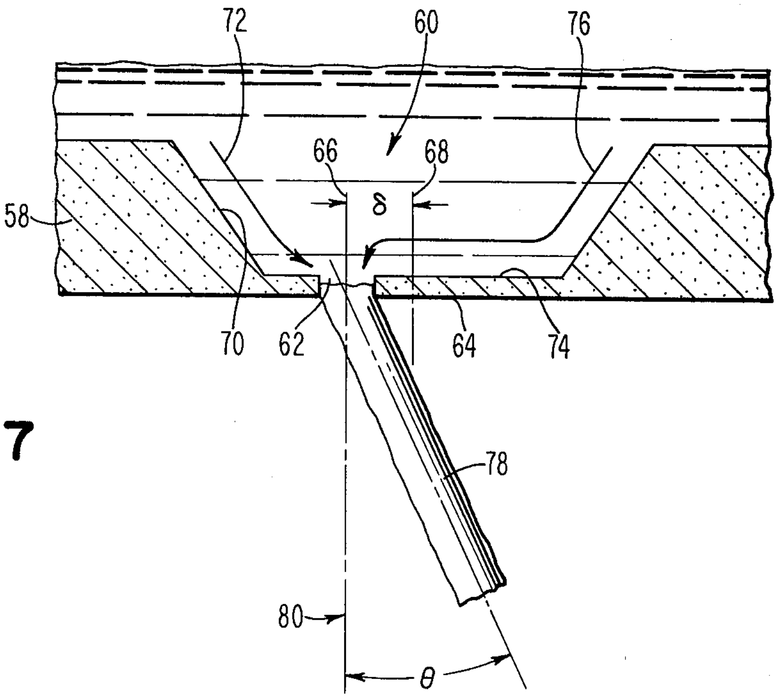
FIG. 7

FIG. 9A
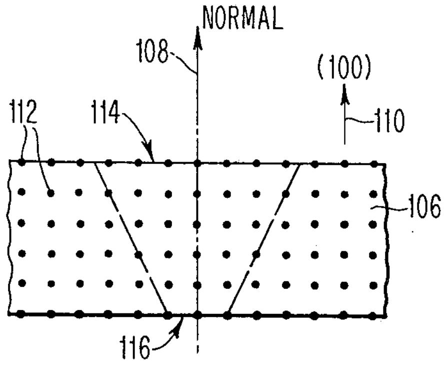
FIG. 10A
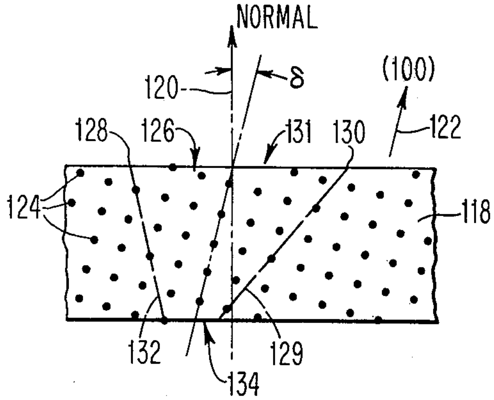
FIG. 9B
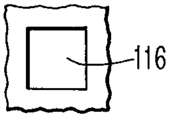
FIG. 10B
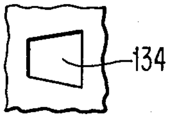
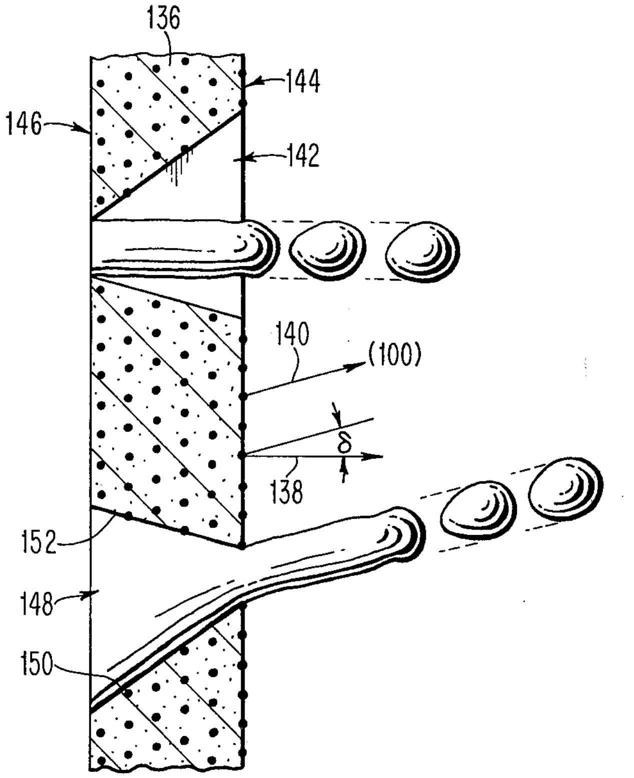
FIG. 11

FIG. 13
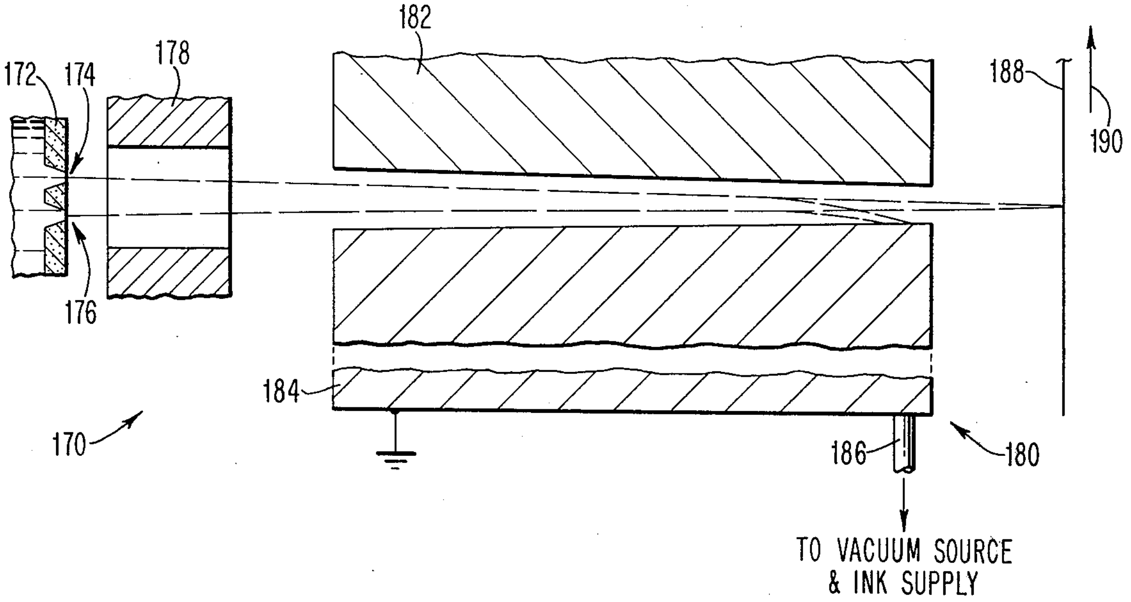
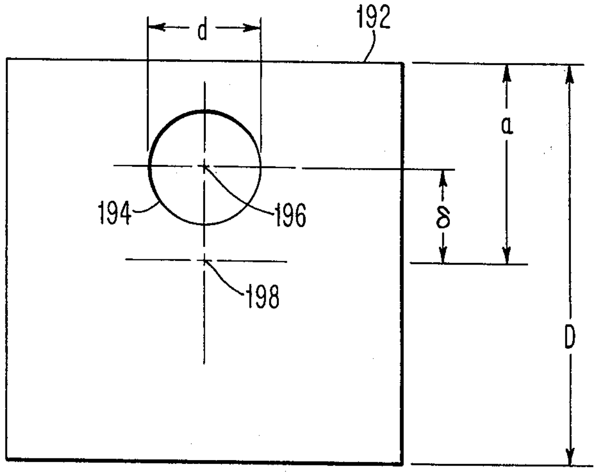
FIG. 14

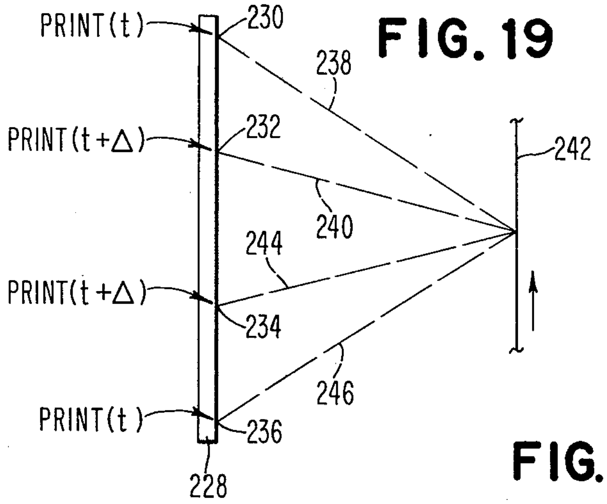
FIG. 19
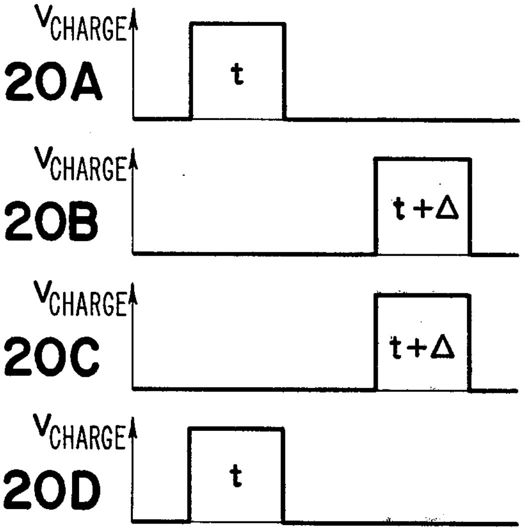
FIG. 20A
FIG. 20B
FIG. 20C
FIG. 20D
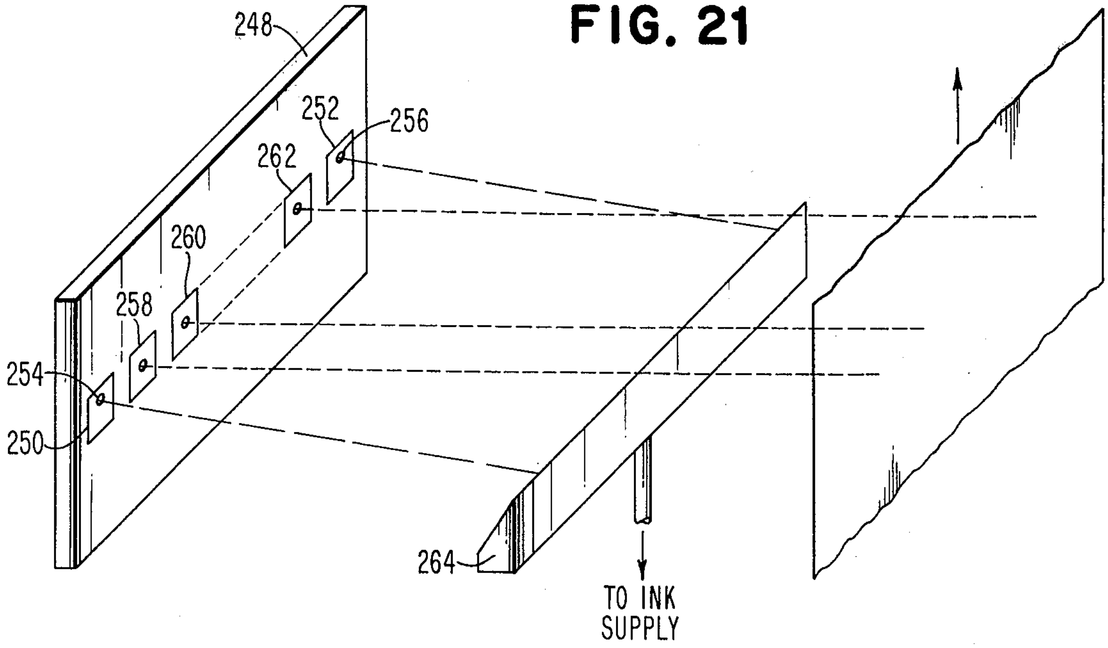
FIG. 21

STAGGERED NOZZLE ARRAY

CROSS REFERENCE TO RELATED APPLICATIONS

Reference Monocrystalline made to copending applications entitled, "Nozzles Formed In Monoceptalline Silicon" , Ser. No. 537,799 filed Dec. 31, 1974 on behalf of Ernest Bassous, now Pat. No. 3,921,916; "Ink Jet Nozzles", Ser. No. 543,600 filed Jan. 23, 1975 on behalf of Ernest Bassous etal; and "Method and Apparatus for Reducing Aerodynamic Retardation of Droplet Streams in a Jet Printing System"; Ser. No. 591,984 filed June 30, 1975 on behalf of Ferdinand Hendriks. Each of the referenced applications is assigned to the assignee of the present invention.

BACKGROUND OF THE INVENTION

In nozzle per spot ink jet printers, the print quality is dependent upon the effective center-to-center distance of adjacent nozzles in an array. In known nozzle technologies relatively close center-to-center distance are achievable, for example, on the order of 3 or 4 mils. This, however, results in a fragile array due to the close centering of the respective nozzles.

The use of laterally staggered multiple arrays as set forth in U.S. Pat. RE. No. 28,219 to Taylor et al. provides an alternative to fabricating nozzles on close centers, while introducing at least two problems.

The first problem is that additional timing networks are utilized to permit the staggered array of Taylor et al to effectively emulate one line of nozzles. That is, for a staggered array of two rows of nozzles, for example, the print signal applied to the upper row of nozzles must be delayed or advanced with respect to the print signal applied to the lower row of nozzles dependent upon the direction of travel of the printing medium, such that the droplets from the two rows of nozzles are sequentially applied a row at a time to form a single line on the printing medium.

The second problem deals with the gutter structure and required deflection voltages. If a single gutter is used, then non-printing droplets from both rows of nozzles must be deflected to the single gutter. This requires a higher deflection voltage than is used for a single row of nozzles due to the different and substantially parallel droplet trajectories from the two rows. Two gutters may be used as in Taylor et al, but this results in a more complex physical structure for the printer.

According to the present invention an ink jet printer including a staggered nozzle array is disclosed, in which the above-named problems are eliminated or at least substantially reduced. This is accomplished by having the droplet streams from at least one of the rows emanate off-normal with respect to the plane of the nozzle plate, resulting in the droplets from the respective rows concurrently converging in non-parallel trajectories to form a single line at a given time on the printing medium. Accordingly, the need for complex timing circuitry to achieve line at a time printing from a staggered nozzle array is substantially reduced. This is so, since all of the dot positions of a line which is to be printed, are printed concurrently by the jets emanating from the respective rows of nozzles, rather than sequentially, that is by a row of nozzles at a time, as disclosed by Taylor et al.

Further, since the gutter is relatively close to the printing medium, the upper set of droplet streams require only slightly more deflection than the lower set of droplet streams in order to gutter the respective droplets. This is so, since the respective droplet streams are converging towards the respective dot positions of the line as they approach the printing medium. Therefore, a deflection voltage may be used for the respective droplet streams which is essentially the same as would be used for a single row of streams, since each droplet stream is substantially the same distance from the gutter as they near the printing medium, resulting in the droplets from the respective streams striking the gutter relatively close to one another.

SUMMARY OF THE INVENTION

According to the present invention a jet printer is disclosed which includes a nozzle plate comprised of a semiconductor substrate having at least two rows of nozzles formed therein, with the nozzles in one row being laterally staggered with respect to the nozzles in another row. Each nozzle has entrance and exit apertures of different cross-sectional area, with the exit aperture of each of the nozzles in at least one row being axially misaligned with respect to the longitudinal center axis of their respective entrance apertures. A method of printing at least a portion of a line at a time on a printing medium is accomplished, wherein the line is comprised of a plurality of dot positions. The jets from one row of nozzles are directed towards a selected first group of non-adjacent dot positions of said line on the printing medium, and concurrent therewith the jets from another row of nozzles are directed in a non-parallel trajectory with respect to the trajectory of the jets from the one row of nozzles, towards a selected second group of non-adjacent dot positions of the line on said printing medium.

BRIEF DESCRIPTION OF THE DRAWINGS

FIGS. 5 and 6 are cross-sectional views illustrating fluid flow in normal and reverse directions, respectively, through a tapered nozzle;

FIG. 7 is a cross-sectional view of a membrane silicone nozzle in which the exit aperture of the nozzle is offset with respect to the longitudinal center axis of the entrance aperture of the nozzle, and which illustrates fluid flow from the nozzle;

FIG. 9 is a cross-sectional view of a tapered nozzle formed in a silicon wafer of (100) crystal orientation, wherein the wafer normal is aligned with respect to the (100) crystal axis;

FIG. 10 is a cross-sectional view of a tapered nozzle formed in a silicon wafer of (100) crystal orientation, wherein the wafer normal is misaligned with respect to the (100) crystal axis;

FIG. 11 illustrates a tapered nozzle array formed in a silicon wafer of (100) crystal orientation, wherein the wafer normal is misaligned with respect to the (100) crystal axis, and which illustrates fluid flow from the array;

FIG. 13 is a cross-sectional view of an ink jet printing system including a staggered jet nozzle array in accordance with the present invention;

FIG. 14 is a front view of a membrane nozzle having a circular exit aperture which is offset from the center of the membrane;

Figure 18:
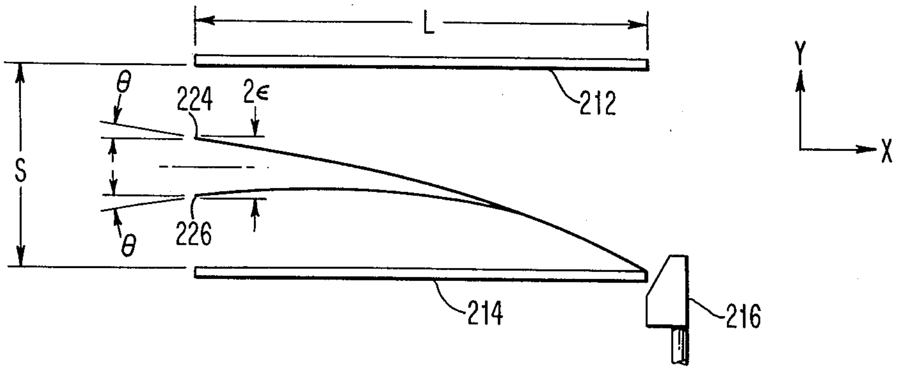

Flg. 17 is a pictorial representation of a normal droplet trajectory towards a gutter;

FIG. 18 is a pictorial representation of the off-normal droplet trajectories for two droplet streams towards a gutter;

FIG. 19 is a pictorial representation of a plurality of droplet streams emanating from a staggered nozzle array according to the present invention;

FIGS. 20A–20D are timing diagrams which illustrate the times at which charging voltages are applied to the droplets emanating from the respective rows of nozzles in the nozzle array of FIG. 19; and FIG. 21 is a pictorial view of an ink jet printing system including a nozzle array which includes guard jets on the perimeter of the array for minimizing the aerodynamic retardation felt by the jets emanating from the nozzles on the interior of the array.

DETAILED DESCRIPTION OF THE INVENTION

According to the present invention, a method of printing a portion of a line at a time, a line at a time, or several lines at a time from a jet nozzle array is disclosed. The jet nozzle array may be fabricated in a semiconductor material using conventional semiconductor processing techniques. The preferred material is semiconductor silicon, however, it is to be appreciated that other semiconductor materials such as germanium, gallium arsenide, or the like, may be utilized in the practice of the present invention. Also, it is to be appreciated that materials other than semiconductors may be used in the practice of the present invention. The processing technique used in the preferred embodiment, that is for silicon, utilizes an anisotropic chemical etchant for generating holes of desired geometries in the semiconductor material. The preferred geometry is that the hole is tapered from entrance to exit aperture.

In one embodiment the hole has a polygonal entrance aperture which tapers to a polygonal exit aperture. In practice, the corners of the apertures may be rounded off to minimize stress concentrations which may result in failure or excessive wear of a nozzle. In another embodiment the hole is in the shape of a truncated pyramid having a rectangular entrance aperture which tapers to a rectangular cross-sectional area in which is formed a membrane having a circular orifice formed therein.

The excellent performance characteristics of the present nozzle array is directly related to the influence of crystal symmetry on the geometry of the nozzle which results in the nozzle having predictable directional and velocity characteristics and high nozzle efficiency.

As is known, anisotropic etchants attack crystalline materials at different rates in different crystallographic directions. Numerous anisotropic etchants are known for monocrystalline silicon which include alkaline liquids or mixtures thereof. As common single crystal silicon anisotropic etchants, there may be mentioned aqueous sodium hydroxide, aqueous potassium hydroxide, aqueous hydrazine tetramethyl, ammonium hydroxide, mixtures of phenols and amines such as a mixture of pyrochatechol and ethylene diamine with water, and mixtures of potassium hydroxide, n-propanol and water. These and other preferential etchants for monocrystalline silicon are usable in the process of the present invention for forming jet nozzle arrays.

With respect to the three most common low index crystal planes in monocrystalline silicon, the anisotropic etch rate is greatest for (100) oriented silicon, somewhat less for (110) and is least for (111) oriented silicon. How the abovementioned silicon processing techniques are utilized to form the nozzle arrays of the present invention are to be described shortly.

Figure 1:
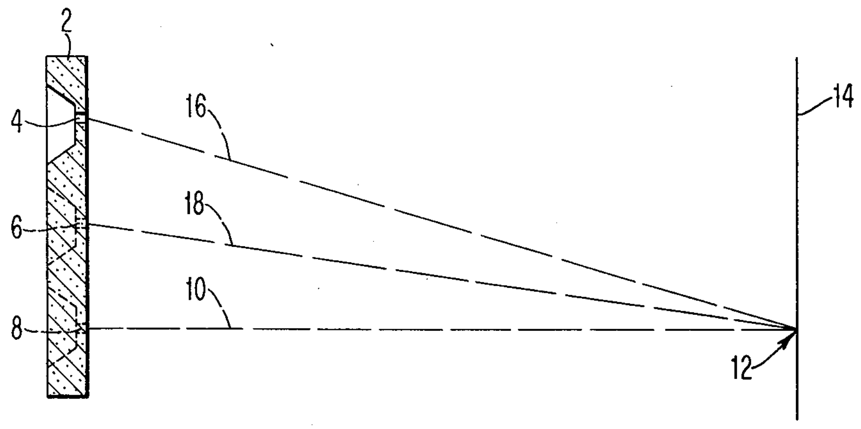
FIG. 1 is a sectional side view of a staggered nozzle array for printing a line at a time according to the present invention.

FIG. 1 illustrates a silicon nozzle array 2 in which the nozzles in one row are laterally staggered with respect to the nozzles in another row. That is, the nozzle orifices in one row are mutually offset with respect to the orifices in another row in a direction normal to the plane of FIG. 1. Also, the nozzles in certain rows have their exit apertures axially misaligned with respect to the longitudinal center axis of their respective entrance apertures, resulting in a non-normal jet trajectory with respect to the plane of the nozzle plate. It is seen that the jet trajectory 10 from the nozzle 8 is substantially normal to the plane of the nozzle plane 2, such that the jet 10 strikes a predetermined dot position in a row 12, normal to the plane of the figure, on a printing medium, such as a paper 14. Accordingly, if the jet emanating from nozzles 4 and 6 are to strike other dot positions in the row 12, the jet trajectories from nozzles 4 and 6 must be non-normal with respect to the plane of nozzle plate 2 and must have a non-parallel trajectory with respect to the jet trajectory 10. Thus, the amount of axial offset of the respective exit apertures of the nozzles in rows 4 and 6 and predetermined such that the jet trajectories 16 and 18 therefrom strike dot positions on the row 12 such that a line at a time is printed.

Figure 2:
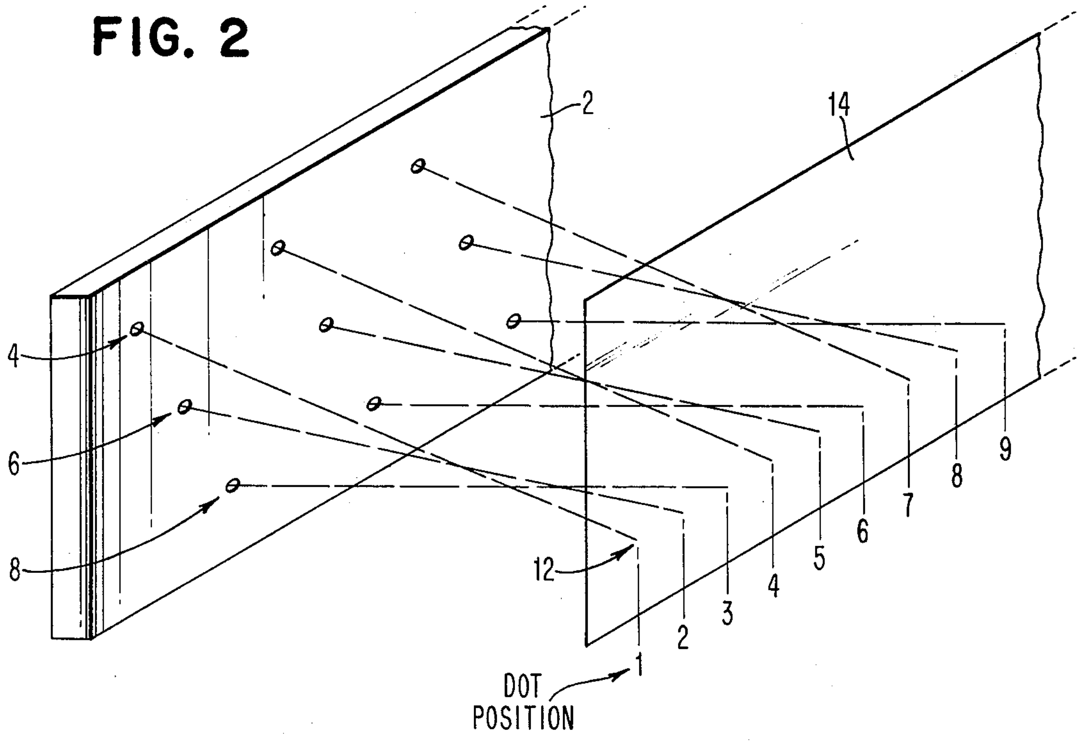
FIG. 2 is a perspective view of a staggered nozzle array according to the present invention.

FIG. 2 is a perspective view of the nozzle plate 2 which more clearly illustrates how the jets emanating from the rows 4, 6 and 8 are able to produce adjacent dots for forming the line 12 on the paper 14. That is, the jets emanating from row 4 mark non-adjacent dot positions 1, 4 and 7; the jets emanating from row 6 mark non-adjacent dot positions 2, 5 and 8; and the jets emanating from row 8 mark non-adjacent dot positions 3, 6 and 9.

Figure 3:
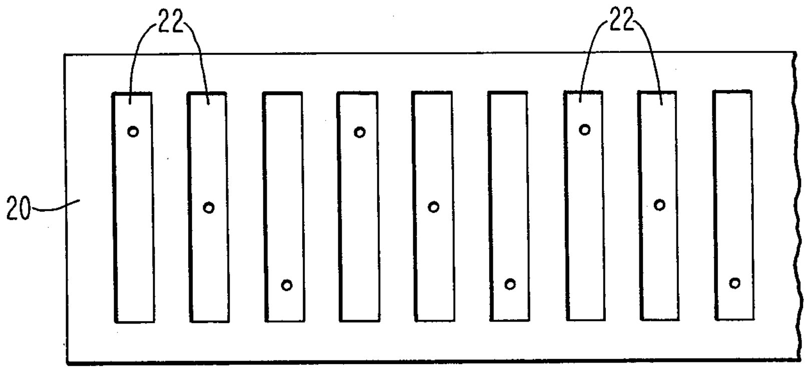
FIG. 3 is a front view of a charge electrode structure which may be utilized in the practice of the present invention.

FIG. 3 illustrates a charge electrode structure 20 which may be utilized in the practice of the present invention.

The charge electrode structure 20 may be comprised of a substrate such as a ceramic material with a plurality of slots 22 formed therein, with the slots being machined such that they may accommodate the passage of droplet streams at different trajectories and from different rows. That is, the dimensions of the slot should be such that it may be able to pass a jet from either the first, second or third row. As is known in the art, the interior of the slots are plated with a conductive coating such that voltage may be applied to the respective slots such that droplets passing therethrough may be selectively charged, such that unchanged droplets are used for printing and charged droplets are deflected into a common gutter. The relationship of the charge electrode structure to a complete ink jet printing system is seen in more detail in FIG. 13.

Figure 4:
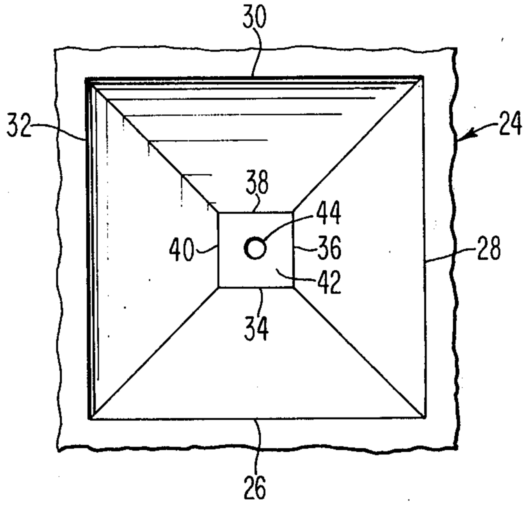
FIG. 4 is a back to front view of a membrane silicon nozzle.

As was previously stated, the nozzle array may include a plurality of nozzles formed in a silicon substrate, in which the holes forming the nozzles are in the shape of a truncated pyramid with the larger aperture forming an entrance aperture and the smaller rectangular portion thereof having a membrane formed therein with a circular orifice in the membrane which acts as the exit aperture. Such a nozzle is described in the referenced patent application Ser. No. 543,600, and is shown in FIG. 4, wherein a silicon wafer 24 has a hole etched therein which has an entrance aperture comprised of sides 26, 28, 30 and 32, and which tapers to a smaller rectangular portion comprised of sides 34, 36, 38 and 40 with a membrane 42 formed therein, and with a circular orifice 44 formed in the membrane. In such a nozzle structure, with the orifice 44 centered in the membrane 42, a jet emanating from the orifice 44 is substantially normal to the plane of the membrane 42. In the orifice 44 is off-center, the jet issuing from the orifice is at a non-normal angle with respect to the plane of the membrane 42. How such a nozzle is fabricated and how one determines the amount off-center the orifice should be for producing a predetermined off-normal jet trajectory is described shortly.

Refer now to FIGS. 5 and 6. FIG. 5 illustrates fluid flow in a normal direction through a tapered nozzle formed in a silicon wafer 45, that is, fluid flows from the larger aperture 46 to the smaller aperture 48. Conversely, FIG. 6 illustrates fluid flow in the reverse direction, that is, from the smaller aperture 48 to the larger aperture 46. Fluid flow through the nozzle in the forward direction as illustrated in FIG. 5 is characterized by uniform convergence of flow to the orifice 48 with velocity components illustrated by arrows 50 and 52, respectively. Fluid flow in the reverse direction as illustrated in FIG. 6 is characterized by a sharp change in direction of flow near the orifice 48 with velocity components illustrated by arrows 54 and 56. The velocity of flow in the forward direction, $V_f$, is greater than the velocity flow in the reverse direction, $V_r$. As pressure increases, the difference between $V_f$ and $V_r$ decreases. FIG. 7 illustrates a membrane silicon nozzle formed in a silicon wafer 58 which has an entrance aperture 60 and an exit aperture 62 formed in a membrane 64, with the aperture 62 having a center line 66 which is displaced from the center axis 68 of the membrane by an amount δ. Fluid flow along a wall 70, as indicated by an arrow 72, is similar to the fluid flow in a forward direction through a nozzle as illustrated in FIG. 5, whereas fluid flow along the surface 74 of the membrane 64, as indicated by an arrow 76, is similar to fluid flow in a reverse direction through a nozzle as illustrated in FIG. 6. Accordingly, fluid velocity in the direction as indicated by the arrow 72 is greater than the fluid velocity in the direction, as indicated by the arrow 76, such that the jet 78 emanating from the orifice 62 is at an angle θ with respect to the wafer normal 80, which in this instance coincides with the center line 66. The amount of center axis displacement δ which results in a given off-normal angular deflection θ is described shortly.

Figure 8A:
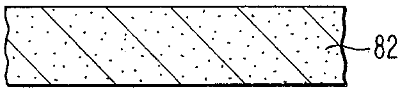
FIGS. 8A-8J represent sequential cross-sectional views of a silicon wafer processed in accordance with the present invention for forming a membrane silicon nozzle with an offset exit aperture.
Figure 8B:
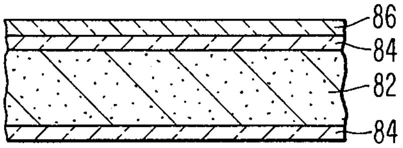
Figure 8C:
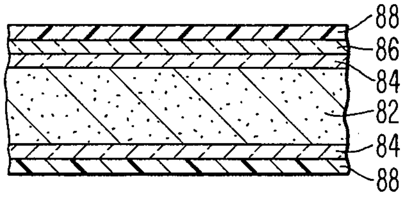
Figure 8D:
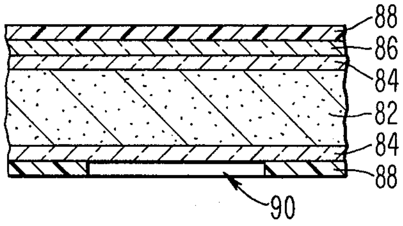
Figure 8E:
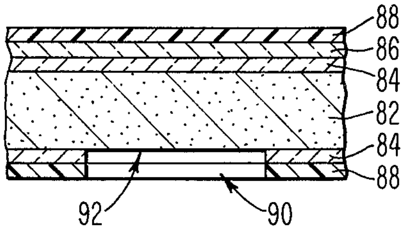
Figure 8F:
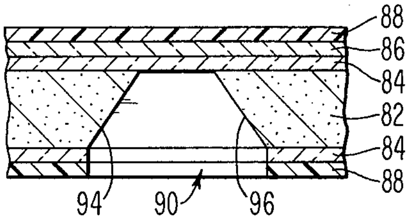
Figure 8G:
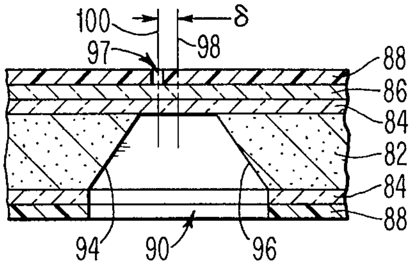
Figure 8H:
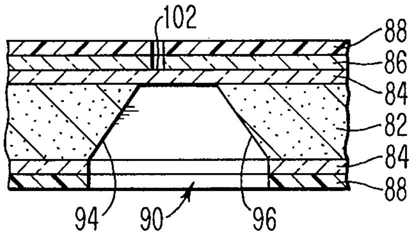
Figure 8I:
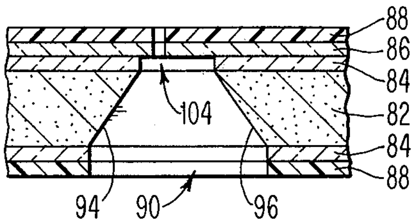
Figure 8J:
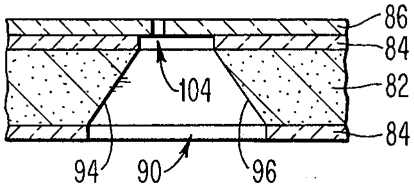

FIGS. 8A–J illustrate one exemplary sequence of processing steps for forming a single jet nozzle or an array of jet nozzles according to the present invention. As shown in FIG. 8A, a silicon wafer 82 having a standard chemically-mechanically polished surface of p- or n-type having (100) orientation is first cleaned. Then, as shown in FIG. 8B, the silicon wafer 82 is oxidized in steam at 1,000° C to form an $SiO_2$ film 84 ~ 4500A thick on the front and back of the wafer, with a layer of membrane material 86, for example pyrex, being deposited on the front $SiO_2$ layer 84. Next, as shown in FIG. 8C, the wafer is then coated with a photoresist material 88 on the front and back thereof. Then, as shown in FIG. 8D, a nozzle base hole pattern 90 is exposed and developed in the back photoresist layer 88. Next, as illustrated in FIG. 8E, the $SiO_2$ layer in the opening 90 is etched away in a buffered hydrofluoric acid, to the back surface 92 of the wafer 82. As shown in FIG. 8F, the silicon is then etched from the opening 90 in an anisotropic etchant, for example, a solution containing ethylene diamine, pyrochatecol and water, at 110°–120° C to form a tapered opening in the wafer. The tapered opening is defined by walls 94 and 96. The etching period is generally on the order of 3–4 hours for a substrate on the order of 8 mils thick. Next, as shown in FIG. 8G, a hole pattern 97 is exposed and developed in the front photoresist layer 88, with the orifice pattern being offset from the center axis 98 to an axis 100 by a distance δ. Then, as illustrated in FIG. 8H, the membrane layer 86 is etched to a front surface 102 of the $SiO_2$ layer 84. Next, as illustrated in FIG. 8I, the $SiO_2$ layer 84 directly under the orifice pattern 102 is etched away leaving an exit orifice 104. Finally, as illustrated in FIG. 8J, the photoresist layer 88 is removed from the front and back of the wafer, and the nozzle may then be oxidized to prevent corrosion or the like.

FIG. 9A illustrates a silicon wafer 106 of (100) crystal orientation, wherein the wafer normal 108 is aligned with respect to the (100) crystal axis 110, which is indicated within the wafer 106 by dots 112. The wafer 106 has an opening etched therein in the shape of a truncated pyramid having a polygonal entrance aperture 114 which tapers to a smaller polygonal exit aperture 116, such that fluid flow from the entrance aperture 114 to the aperture 116 is substantially normal to the wafer face. FIG. 9B is an end view of the orifice 116. Fluid emitted from the orifice 116 is rectangular in cross-section immediately as it exits, however, due to the surface tension of the fluid, the cross-section of the jet stream soon becomes circular.

Refer now to FIG. 10A which illustrates a silicon wafer 118 of (100) crystal orientation, wherein the wafer normal 120 is misaligned with respect to the (100) crystal axis 122 by an angular amount δ. The crystal orientation is schematically illustrated by the dots 124 within the wafer 118. Etchant is applied to the surface 126 of the wafer, in the area which is defined in part by the points 128 and 130. This area defines a large aperture 131. The wafer etches fastest along a wall 129 and slower along a wall 132, due to the crystallographic orientation of the wafer, resulting in a smaller aperture 134 which is misaligned or off-center with respect to the longitudinal center axis 120 of the larger aperture 131. FIG. 10B as an end view of the smaller aperture 134, is seen to be polygonal and non-rectangular in shape. Also, it is seen that the smaller orifice 134 is misaligned or off-center, with respect to the longitudinal center axis of the larger aperture 131. In this instance the longitudinal center axis of the larger aperture is identical with the line 120 which designates the wafer normal. If fluid is made to flow from the larger aperture 131 to the smaller aperture 134, the jet issues from the orifice 134 at an angle with respect to the wafer normal.

FIG. 11 illustrates a silicon wafer 136 of (100) crystal orientation, wherein the wafer normal 138 is misaligned by an angular amount $\theta$ with respect to the (100) crystal axis 140. An opening 142 is formed in the wafer by etching from the front face 144 to the back face 146. Another opening 148 is formed by etching in the reverse direction, that is, from the back face 146 to the front face 144. If fluid, from a source (not shown), is in contact with the face 146, fluid flow through the opening 142 is similar to that from a classical orifice, since the fluid does not touch the walls of the opening and the jet trajectory is essentially normal to the front face 144 of the wafer. On the other hand, since the fluid flow through the opening 148 is in contact with the walls of the opening, the jet emanating from the opening is at a non-normal trajectory with respect to the front face 144 of the wafer 136. As previously described, the use of non-parallel jet trajectories may be used to print a line at a time on a printing medium. How openings are etched to form a nozzle array as illustrated in FIG. 11 is set forth in the description which follows for FIG. 12.

FIGS. 12A—12H illustrate one exemplary sequence of processing steps to produce apertures or holes in a single crystal silicon wafer for forming a jet nozzle array. It is to be appreciated that the following process steps may be used in a different sequence. Also, other film materials for performing the same function below may also be used. Further, film formation, size, thickness and the like may be varied.

Figure 12A:
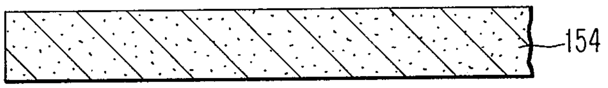
FIGS. 12A–12H represent sequential cross-sectional views of a silicon wafer which is misaligned with respect to the (100) crystal axis, and which is processed in accordance with the present invention.
Figure 12B:
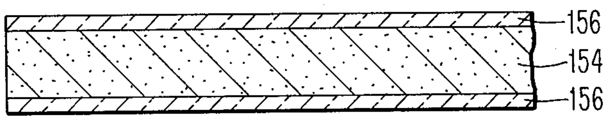
Figure 12C:
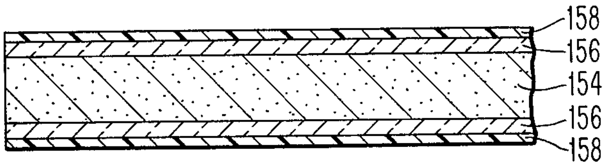
Figure 12D:
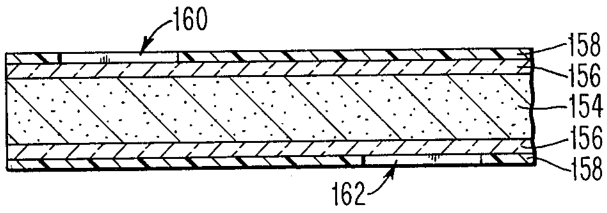
Figure 12E:
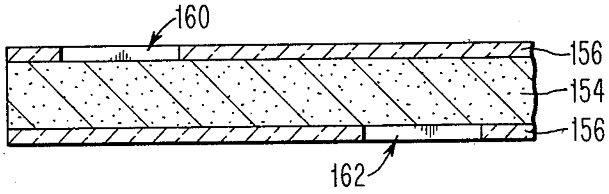
Figure 12F:
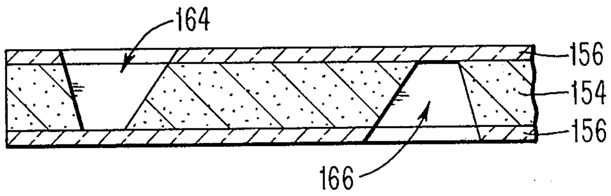
Figure 12G:
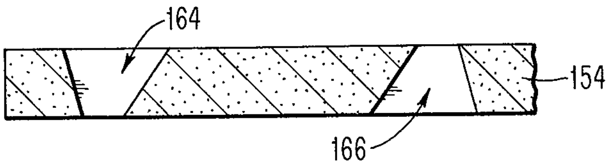
Figure 12H:
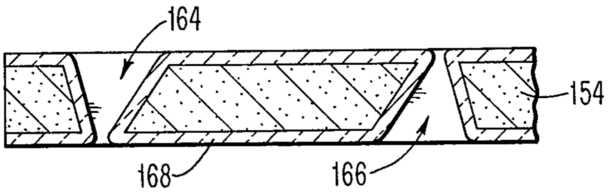

The fabrication steps for forming an array of jet nozzles according to the present invention may be carried out in the following sequence on a silicon wafer, where the wafer normal is misaligned with respect to the (100) crystal axis as set forth in relation to FIGS. 10 and 11. As shown in FIG. 12A, a misaligned silicon wafer 154 which has standard chemically-mechanically polished surfaces of p- or n-type, and of (100) orientation is first cleaned. Then, as shown in FIG. 12B, the silicon wafer 154 is oxidized in steam at 1,000° C to form an $SiO_2$ film 156 ~ 4500A thick on the front and back of the wafer. Next, as shown in FIG. 12C, the oxidized wafer is then coated with a photoresist material 158 on the front and back of the wafer. Then, as shown in FIG. 12D, a nozzle base hole pattern 160 is exposed and developed in the photoresist layer 158 on the front side, and a nozzle base hole pattern 162 is exposed and developed in the photoresist layer 158 on the back of the wafer. Next, as illustrated in FIG. 12E, the $SiO_2$ layer in the openings 160 and 162 are etched away in buffered hydrofluoric acid, and then the photoresist 158 is stripped from both sides of the wafer. As shown in FIG. 12F, the silicon is then etched from the openings 160 and 162 in an anisotropic etchant, for example, a solution containing ethylene diamine, pyrochatecol and water, at 110°–120° C to form the tapered openings 164 and 166, respectively, in the wafer 154. Etching is stopped when orifices appear on the opposite side of the wafer from where the etching started. The etching period is generally on the order of 3–4 hours for a substrate on the order of 8 mils thick. As shown in FIG. 12G, the $SiO_2$ layer 156 is etched from the wafer 154 resulting in a silicon wafer with openings 164 and 166 appearing therein. The wafer 154 then has an $SiO_2$ film 168 grown thereon by oxidation as illustrated in FIG. 12H. The oxide layer 168 helps to prevent corrosion by the inks used in the ink jet printer. It is to be appreciated that other corrosion-resistant films may be used.

FIG. 13 illustrates generally at 170 an ink jet printing system in cross-section which utilizes a nozzle array fabricated in accordance with the present invention. A nozzle plate 172 is fabricated in a silicon wafer with two rows of nozzles 174 and 176 which are laterally staggered with respect to the plane of the drawing. The center-to-center distance from the nozzles in one row to another row is on the order of 0.016 inches as illustrated. The nozzles in row 174 are fabricated such that a jet emanating therefrom is at an angle of approximately 1° downward with respect to the normal of the exit plane of the nozzle. The nozzles in row 176 are fabricated such that a jet emanating therefrom is at an upward angle of approximately 1° with respect to the normal of the exit plane of the nozzle. For such a nozzle array the individual nozzles are membrane nozzles fabricated in accordance with the technique set forth in FIGS. 8A–8J. Also, more than two rows of nozzles could be used, but for ease of illustration only two sets of rows are shown. Also, the nozzles could all be pointing at a downward angle, or all pointing at an upward angle. Alternatively, one row of nozzles could emit jets at a normal angle while all others are emitting jets at a non-parallel trajectory with respect to the normal jet trajectory. Also, nozzles with polygonal exit apertures which are fabricated in accordance with the techniques set forth in FIG. 12 could be utilized in the array in place of the membrane nozzles. In such an one row of jets would be normal to the plane of the array and the jets from the other row would be in a non-normal trajectory.

A charge electrode structure 178 having a side dimension of 0.06 inch is spaced on the order of 0.02 inch from the nozzle plate. The charge electrode structure, for example, may be as illustrated in FIG. 3. A deflection and gutter assembly having a side dimension of 0.3 inch and shown generally at 180 is spaced on the order of 0.05 inch from the charge electrode structure 178. A high voltage deflection plate 182 is connected to a high voltage source (not shown). The high voltage used is on the order of 1–2 KV. A low voltage electrode 184 is connected to ground. The low voltage electrode 184 may be made of a porous material and function also as a gutter with a pipe 186 being connected to a vacuum source and an ink supply (not shown) for drawing the guttered ink through the porous material and the pipe 186 for return to the supply. As was stated earlier, the use of non-parallel jet trajectories results in guttered droplet streams striking the deflection plate and gutter assembly at substantially the same point, while not having to utilize an excessively high voltage due to the different trajectories. A printing medium 188 is spaced on the order of 0.07 inch from the deflection and gutter assembly 180 and the non-guttered droplets from the rows 174 and 176 form alternate dot positions of a single line at a time on the printing medium. The paper 188 may be sequentially moved in the direction of an arrow 190 after each row is printed.

Figure 15:
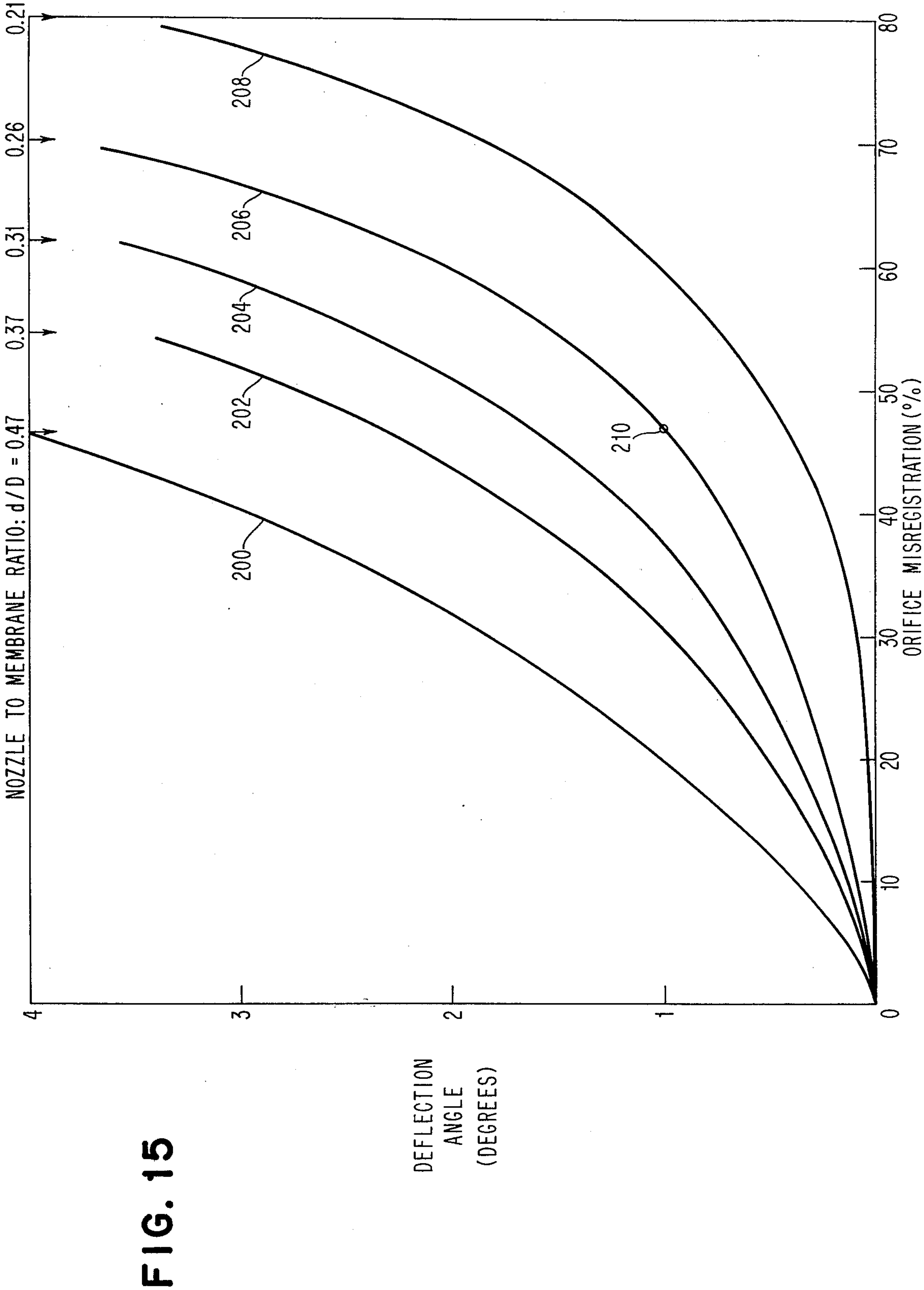
FIG. 15 is a graph of deflection angles versus orifice misregistration for a membrane-type nozzle.

Refer now to FIG. 14 which illustrates a membrane nozzle having an off-center orifice axis which results in a 1° angle trajectory of a jet relative to the normal of the plane of the membrane, and to FIG. 15 which is a plurality of curves which are used to determine the deflection angle dependent upon the amount the orifice is off-center as well as the size of the orifice. In FIG. 14, the membrane portion 192 of a membrane silicon nozzle fabricated in accordance with FIG. 8 is illustrated, wherein the exit orifice 194 has its center axis 196 displaced a distance δ from the center axis 198 of the membrane. The curves 200, 202, 204, 206 and 208 of FIG. 15 represent different nozzle-to-membrane ratios for a given pressure.

The equations used for determining the angle of deflection relative to the normal of the plane of the array from FIG. 15 are as follows:

Nozzle-to-membrane ratio $=(d/D)$

Orifice misregistration (%) $= (\delta/a) \times 100$ for the dimensions where:

D is the side dimension of the square membrane;

d is the diameter of the orifice in the membrane;

$$a = (D/2)$$

δ is the distance from the center axis of the membrane to the center axis of the orifice. For the dimensions shown on FIG. 14:

Nozzle-to-membrane ratio $= (d/D) = 1/3.85 \simeq 0.26$; and

Orifice misregistration (%) $= (\delta/a) \times 100 = (90/1.925) \simeq 47\%$

For a nozzle-to-membrane ratio of approximately 0.26, the curve 206 of FIG. 15 is utilized to determine the off-normal jet angle. As set forth above, the orifice misregistration is approximately 47%, therefore, the point 210 on the curve 206 of FIG. 15 is determinative of the off-normal jet angle for the membrane nozzle of FIG. 14. It is seen from FIG. 15 that the off-normal jet angle is approximately 1°. For the orientation shown, that is, the orifice formed above the membrane center axis, the jet would emanate at a downward angle. On the other hand if the orifice is formed below the center axis of the membrane, the jet would emanate at an upward angle. For the graph shown, deflection angles approaching 4° are readily obtainable.

Figure 16:
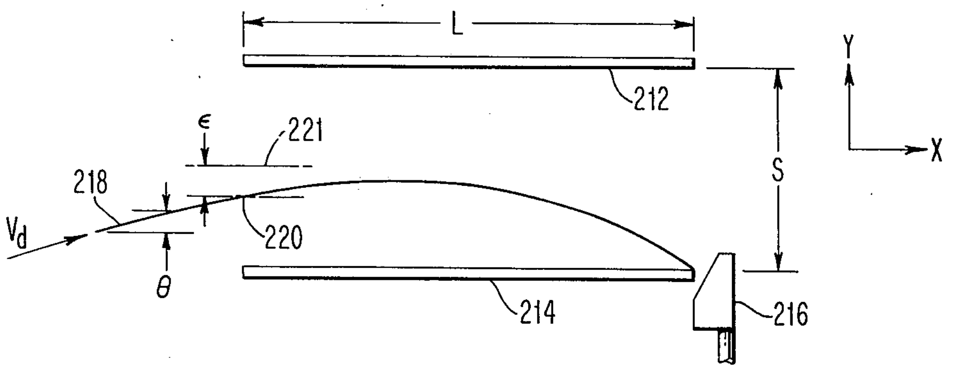
FIG. 16 is a pictorial representation of an off-normal droplet trajectory towards a gutter.

As was previously stated, the present invention allows for a single gutter and deflection assembly in which standard deflection voltages may be used, and wherein the guttered droplets from the respective rows of the array are guttered in substantially the same position in the gutter. This is more readily seen with respect to FIGS. 16, 17 and 18. FIG. 16 illustrates a deflection system including a high voltage deflection plate 212, a low voltage deflection plate 214 and a gutter 216. A droplet stream 218 has a velocity $V_d$ at an angle θ with respect to the normal of the plane of the nozzle array, with the droplets at a point 220 being displaced an amount ε from the central longitudinal axis 221 between the deflection plates. The following parameters and equations define the trajectory of guttered droplets for a system as set forth in FIG. 16, where:

$V_d$ = droplet velocity;

$V$ = deflection voltage; 4

$S$ = plate separation;

$Q_d$ = charge on drops;

$m_d$ = mass of drops;

$a$ = acceleration; and $\epsilon$ = distance of droplet from $x$ axis when entering deflection plate.

1. $V_{ox} = V_d \cos\theta$ (initial velocity along x axis)

2. $V_{oy} = V_d \sin\theta$ (initial velocity along y axis)

$$(3) \quad F = m_d a = \frac{-V}{S} Q_d \longrightarrow a = \frac{-V}{S} \frac{Q_d}{m_d} \text{ (force on a droplet)}$$

4. $x = V_{ox} t = (V_d \cos\theta) t$

5. $y = y_o + V_{oy} t + \tfrac{1}{2} a t^2$

6. $y = -\epsilon + V_d \sin\theta\, t + \tfrac{1}{2} a t^2$ $$(7) \quad y = -\epsilon + \frac{V_d \sin\theta}{V_d \cos\theta} x + \tfrac{1}{2} a \frac{x^2}{V_d^2 \cos^2\theta}$$

For drops on lower jet (aimed upward, displaced ε downward):

$$(8) \quad y_L = -\epsilon + \tan\theta\, x + \tfrac{1}{2} a \frac{x^2}{V_d^2 \cos^2\theta}$$

For drops on upper jet (not shown) aimed downward, displaced ε upward:

$$(9) \quad y_U = \epsilon - \tan\theta\, x + \tfrac{1}{2} a \frac{x^2}{V_d^2 \cos^2\theta}$$

Figure 17:
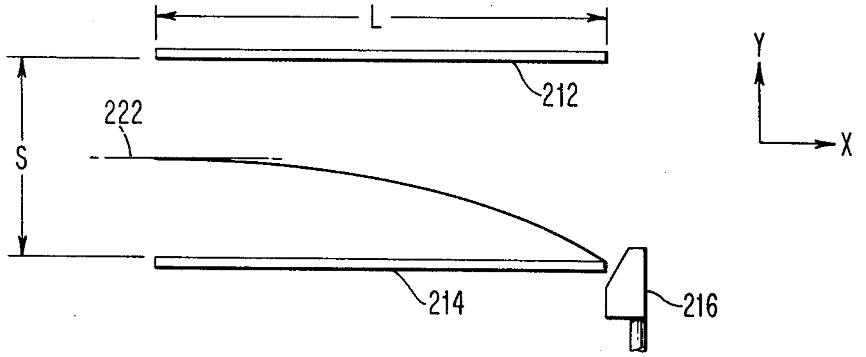

FIG. 17 illustrates a normal jet trajectory relative to the plane of the nozzle plate which is guttered in the gutter 216. The following equations describe the y jet trajectory in such an instance.

$$(10) \quad y = \tfrac{1}{2} a \frac{x^2}{V_d^2} \left( \text{gutter condition: } x = L,\ S = -\frac{S}{2} \right)$$

With all variables (velocity, voltages, etc.) held fixed, the trajectory of the upper and lower drop streams as described by equations (8) and (9) will merge in approximately the same place as the drop stream as described by equation (10) if $\epsilon = L \tan\theta$ since at $x = L$ $$(11) \quad y_L = y_U = \tfrac{1}{2} a \frac{L^2}{V_d^2 \cos^2\theta} \approx \frac{S}{2}$$

since:

$$(12) \quad \cos^2\theta \simeq 1-\theta^2 \cong 1-(1/57.3)^2 = 0.9997 \text{ (for } \theta = 1°)$$

FIG. 18 illustrates the jet trajectories from two rows of nozzles when the jets 224 from the upper row are deflected at a downward angle θ relative to the normal of the nozzle plate, and the lower row of jets 226 are directed at an upward angle $\theta$ with respect to the normal of the nozzle plate. It is to be appreciated that this is one of the worst case conditions for non-parallel jet trajectories from respective rows of nozzles to be guttered in a single gutter. For a deflection plate having a length of 0.3 inches and an angle $\theta$ of 1°, then $\epsilon = (0.3/57.3)$ which $\approx$ 0.005 inches. These are the dimensions set forth for the ink jet printing system in FIG. 13, and it is seen that with these dimensions the jets 224 and 226 will strike the gutter in approximately the same position with the same deflection voltage applied to both jets.

FIG. 19 illustrates a nozzle plate 228 having laterally staggered rows of nozzles 230, 232, 234 and 236, with the jets 238 and 240 from the rows 230 and 232, respectively, being directed at a downward angle towards a printing medium 242, and with jets 244 and 246 from rows 234 and 236, respectively, being directed at an upward angle towards the printing medium 242. It is seen that the distance the drops emanating from rows 232 and 234 have to travel are substantially the same, and that the distance the drops from the rows 230 and 236 have to travel are also substantially the same. Further, it is seen that the distance the drops from the rows 230 and 236 have to travel is farther than the distance the drops from the rows 232 and 234 have to travel. Accordingly, drops emanating from the rows 230 and 236 must have a print signal applied to them at a time $\Delta$ earlier than print signals which are applied to the droplets emanating from rows 232 and 234. In other words the drops emanating from the rows 232 and 234 have print signals applied to them which are delayed relative to the print signals for rows 230 and 236. This is seen more clearly in relation to FIG. 20, wherein FIG. 20A and FIG. 20D are the print signals applied to drops emanating from rows 230 and 236, respectively, whereas the print signals illustrated in FIGS. 20B and 20C are the print signals applied to drop emanating from rows 232 and 234. Since the print signals applied to drops from rows 230 and 236 occur at the same time, they may be driven from a common timing source. The print signals applied to drops from rows 232 and 234 may be driven from another common driving source. Accordingly, for a system as illustrated in FIG. 19 the timing and delay networks utilized may be reduced by a factor of 2 relative to known laterally staggered printing systems which have a different timing sequence for each row. It is to be appreciated, however, that the actual path length differences are typically very small and that for many printing applications delay networks may be unnecessary. For example, with reference to FIG. 19, if the distance between adjacent rows are each 0.016 inch and the distance between nozzle plate 228 and printing medium 242 is 0.5 inch, the maximum path length difference for drop streams is about 0.0005 inch. For many printing applications, the drop placement error caused by this path length difference is negligibly small, so that delay networks would not be needed which greatly simplifies the circuitry.

As set forth in the previously referenced patent application Ser. No. 591,984 of Hendriks, guard jets may be utilized to prevent aerodynamic retardation of droplet streams which are to be used for printing. This is, droplet streams on the perimeter of an array are continuously guttered to set up an air flow which prevents aerodynamic retardation of droplet streams emitted from nozzles on the interior of the array. In FIG. 21, a nozzle array 248 includes a plurality of membrane-type nozzles in which nozzles 250 and 252 on the perimeter of the array have their respective orifices 254 and 256 offset in an upward direction with respect to the orifices of the remaining nozzles 258, 260 and 262. Also, the orifices 254 and 256 may be made larger than the orifices of the other nozzles such that the emitted droplets are larger and create a greater air flow. Charging and deflection electrodes are not shown for clarity of the drawing. For the system shown, the droplet streams emanating from the nozzles 250 and 252 are at a downward angle with respect to the normal of the plane of the nozzle plate and are aimed at a gutter 264 such that the droplets from the nozzle 250 and 252 are continuously guttered and require no charging and/or deflection voltages. The droplet streams emanating from the interior of the array, namely from the nozzles 258 and 260 and 262 are selectively charged and accordingly guttered in accordance with standard ink jet printing practices while not requiring complex electronic circuitry to compensate for the normal aerodynamic drag of printing droplets on the exterior of the array.

What is claimed is:

1. In a jet printer including a nozzle plate having at least two rows of nozzles, with the nozzles in one row being staggered with respect to the nozzles in another row, a method of printing at least a portion of a line at a time on a printing medium, wherein said line is comprised of a plurality of dot positions, said method comprising the steps of:

directing the jets from one row of nozzles towards a selected first group of non-adjacent dot positions on said line on said printing medium; and directing the jets from another row of nozzles, in a non-parallel trajectory with respect to the trajectory of the jets from said one row of nozzles, towards a selected second group of non-adjacent dot positions on said line on said printing medium.

2. The method of claim 1, including the step of:

selecting for printing certain ones of the droplets forming each of said jets, and guttering in a single gutter the unselected droplets from the jets emanating from the respective rows of nozzles.

3. In a jet printer including a nozzle plate having at least two rows of nozzles, with the nozzles in one row being staggered with respect to the nozzles in another row, a method of printing at least a portion a line at a time on a printing medium, wherein said line is comprised on a plurality of dot positions, said method comprising the steps of:

directing the droplets emanating from one row of nozzles towards a selected first group of non-adjacent dot positions of said line on said printing medium;

directing the droplets from another row of nozzles, in a non-parallel trajectory with respect to the trajectory of the droplets from said one row of nozzles, towards a selected second group of non-adjacent dot positions of said line on said printing medium;

selecting the droplets emanating from said one and said another row of nozzles which are to be used for printing; and guttering in a single gutter the unselected droplets emanating from the respective nozzles.

4. In a jet printer including a nozzle plate having at least two rows of nozzles, with the nozzles in one row being laterally staggered with respect to the nozzles in another row, a method of printing a line at a time on a printing medium, wherein said line is comprised of a plurality of dot positions, said method comprising the steps of:

directing, at a downward angle with respect to the plane of said nozzle plate, the droplets emanating from one row of nozzles towards a selected first group of non-adjacent dot positions on said printing medium; and directing, at an upward angle with respect to the plane of said nozzle plate, the droplets emanating from another row of nozzles towards a selected second group of non-adjacent dot positions on said printing medium.

5. The method of claim 4, including the steps of:

selecting the droplets emanating from the respective rows of nozzles which are to be used for printing; and guttering in a single gutter the unselected droplets emanating from the respective rows of nozzles.

6. In a jet printer including a nozzle plate having at least two rows of nozzles, with the nozzles in one row being laterally staggered with respect to the nozzles in another row, a method of printing at least a portion of a line at a time on a printing medium, wherein said line is comprised of a plurality of dot positions, said method comprising the steps of:

directing, at a substantially normal angle with respect to the plane of said nozzle plate, the droplets emanating from one row of nozzles towards a selected first group of non-adjacent dot positions on said printing medium;

directing, at a non-normal angle with respect to the plane of said nozzle plate, the droplets emanating from another row of nozzles towards a selected second group of non-adjacent dot positions on said printing medium;

selecting the droplets emanating from the respective rows of nozzles which are to be used for printing; and guttering in a single gutter the unselected droplets emanating from the respective rows of nozzles.

7. A nozzle plate for a jet printer, comprising:

a substrate having at least two rows of orifices, with the orifices in one row being laterally staggered with respect to the orifices in another row, and with the orifices in at least one row being misaligned relative to a selected reference line in the plane of said substrate.

8. The combination of claim 7, wherein said substrate is a semiconductor substrate.

9. The combination claimed in claim 8, wherein said semiconductor substrate is silicon.

10. The combination claimed in claim 7, wherein said orifices are circular in cross-section.

11. The combination claimed in claim 7, wherein said orifices are rectangular in cross-section.

12. The combination claimed in claim 7, wherein said orifices are square in cross-section.

13. A nozzle plate for a jet printer, comprising:

a semiconductor substrate having at least two rows of nozzles formed therein, with the nozzles in one row being laterally staggered with respect to the nozzles in another row, with each nozzle having entrance and exit apertures of different cross-sectional area, and with the exit apertures of each of the nozzles in at least one row being axially misaligned with respect to the longitudinal center axis of their respective entrance apertures.

14. The combination claimed in claim 13, wherein said semiconductor substrate is a silicon substrate.

15. The combination claimed in claim 14, wherein the entrance and exit apertures of each of the nozzles are rectangular in cross-section, with the entrance and exit apertures having different cross-sectional areas.

16. The combination claimed in claim 15, wherein in one row of nozzles the cross-sectional areas of the entrance apertures are larger than the cross-sectional area of exit apertures, and in another row the cross-sectional area of the exit apertures are larger than the cross-sectional area of the entrance apertures.

17. The combination claimed in claim 14, wherein each nozzle in each row has an entrance aperture of rectangular cross-section and an exit aperture of circular cross-section.

18. A nozzle array for a jet printer, comprising:

a silicon wafer of (100) crystal orientation, wherein the wafer normal is misaligned with respect to the (100) crystal axis, with two rows of nozzles formed therein, with the nozzles in one row being laterally staggered with respect to the nozzles in the other row, with each nozzle having entrance and exit apertures of different polygonal cross-sectional area, and with the exit aperture of each nozzle being axially misaligned with respect to the longitudinal center axis of the entrance aperture.

19. A nozzle array for a jet printer, comprising:

a silicon wafer of (100) crystal orientation, wherein the wafer normal is aligned with respect to the (100) crystal axis, with at least two rows of nozzles formed therein, with the nozzles in one row being laterally staggered with respect to the nozzles in another row, with each nozzle having a rectangular entrance aperture on one face of the wafer which tapers to a membrane on the other face of the wafer with a circular exit aperture formed in said membrane, and with the circular exit aperture of each of the nozzles in at least one row being axially misaligned with respect to the longitudinal center axis of the respective entrance apertures.

20. A method of making a nozzle array in a silicon wafer of (100) crystal orientation, wherein the wafer normal is misaligned with respect to the (100) crystal axis, and wherein said nozzle array includes at least two rows of nozzles, said method comprising the steps of:

applying a masking film to said silicon wafer;

coating the front and back of said silicon wafer with a photoresist material;

exposing and developing a plurality of nozzle base hole patterns along a first reference line on the front of said silicon wafer to delineate said first row of nozzles;

exposing and developing a plurality of nozzle base hole patterns along a second reference line on the back of said silicon wafer to delineate said second row of nozzles;

etching away the oxide coating from said wafer;

stripping the photoresist from the front and back of said wafer; and etching through the silicon under the exposed base holes patterns delineating said first and second rows of nozzles until orifices appear on the respective opposite sides of the wafer from where the etching started.

21. The method of claim 20, wherein the base hole patterns delineating said second row of nozzles are laterally staggered with respect to the base hole patterns delineating said first row of nozzles.

22. The method of claim 21, including the step of: coating said silicon wafer with a corrosion-resistant film.

23. A method of making a nozzle array in a silicon wafer of (100) crystal orientation, wherein the wafer normal is aligned with respect to the (100) crystal axis, and wherein said nozzle array includes at least two rows of nozzles, said method comprising the steps of:

applying a masking film to said silicon wafer;

depositing a layer of a membrane material over the masking film on the front side of said silicon wafer;

coating the front and back sides of said silicon wafer with a photoresist material;

exposing and developing a plurality of base hole patterns on the back of said silicon wafer which define said at least two rows of nozzles;

etching away the masking film and the silicon under said base hole patterns;

exposing and developing circular orifice patterns on the front side of said silicon wafer to delineate the exit apertures for each of the nozzles in said at least first and second rows of nozzles, with the circular orifice patterns in at least one row being offset with respect to the center-axis of the respective base hole patterns in said one row;

etching through the membrane layer and masking film under each of the circular orifice patterns, and removing the remaining photoresist.

24. The method of claim 23, wherein the base hole patterns delineating said second row of nozzles are laterally staggered with respect to the base hole patterns delineating said first row of nozzles.

25. The method of claim 24, including the step of: coating said silicon wafer with a corrosive-resistant film.

* * * * *